Oct. 16, 1962        B. P. SANDSTO        3,058,213

STEEL STRAP CUTTING TOOL

Filed Feb. 19, 1960

INVENTON

Bjorn P. Sandsto

BY *Julian Caplan*

*attorney*

United States Patent Office 3,058,213
Patented Oct. 16, 1962

3,058,213
STEEL STRAP CUTTING TOOL
Bjorn P. Sandsto, San Francisco, Calif., assignor to Rixan, Inc., San Francisco, Calif.
Filed Feb. 19, 1960, Ser. No. 9,899
2 Claims. (Cl. 30—134)

This invention relates to a new and improved tool for cutting steel strapping.

At the present, packages, crates and other containers are secured by means of steel strapping which is a relatively thin band of material around the object or its container, the ends of the strap being fastened together by various means. The strap is often subject to considerable tension and when it is necessary to sever the strap at the destination the sudden release of tension sometimes causes the severed ends of the strap to fly apart with considerable force and may cut or otherwise injure personnel or property with which they come in contact.

Accordingly, it is a principal object and advantage of the present invention to provide a tool which grips the strap on either side of the line on which it is severed at the same time that the cutting operation is going on. This prevents the ends of the strap from flying apart. Release of the tool allows the ends of the strap to move apart gradually and without danger to personnel.

A further principal feature and advantage of this invention is the fact that only two jaws are required, the two jaws performing the dual function of gripping the strap and severing the same.

Still another feature of the invention is the fact that a single movement of the handles is required in order to perform the dual function, and this movement is accomplished by a closing of the fingers of the operator in the manner of conventional pliers or shears.

A still further feature of the invention is the fact that the ends of the strap are necessarily securely gripped before the strap is severed. The construction of the tool is such that it is impossible for the shearing action to be performed until the jaws of the tool grip the strap in two locations.

Another feature of the invention is the fact that the jaws may be manufactured separately from the handles to which they are attached. This permits the jaws to be milled from bar stock while the handles are forged, the two parts of each member being welded together. This construction of the tool simplifies manufacture and materially reduces the cost while at the same time enabling the tool to be constructed with extreme accuracy so that the jaws mate properly.

Other objects of the present invention will become apparent upon reading the following specification, and referring to the accompanying drawings in which similar characters of reference represent corresponding parts in each of the several views.

Figure 1:
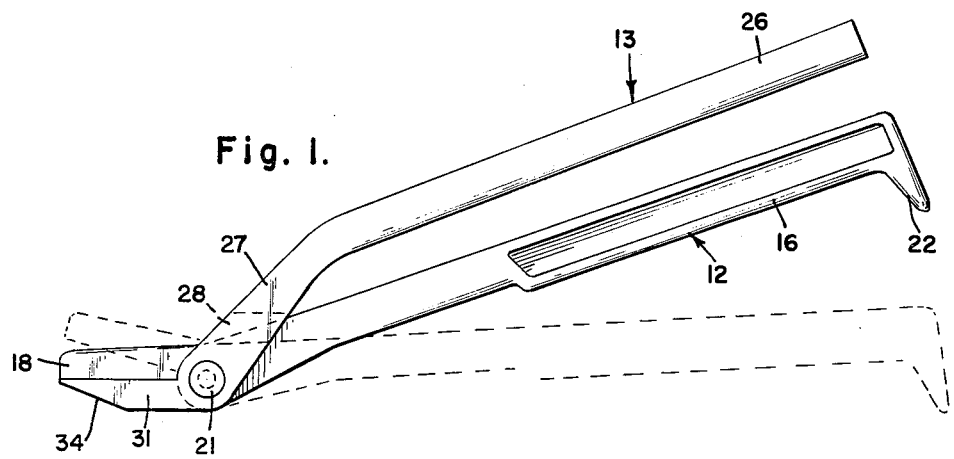
FIG. 1 is a side elevation of the tool showing in dotted lines the open position of the jaw and in solid lines the closed position.
Figure 2:
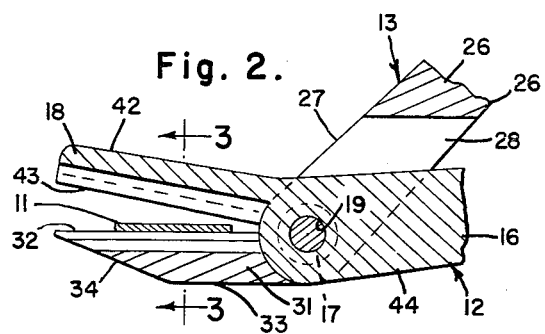
FIG. 2 is an enlarged fragmentary longitudinal midsection of the jaws and related structure.

The present invention provides a tool used to sever conventional wire strapping 11. Such strapping has widths which varies, depending upon the necessities of the particular job, but is generally a thin piece of steel.

The tool, which is the subject of this invention, consists of an upper jaw member 12 and lower jaw member 13. The upper jaw member 12 is formed with an elongated handle 16, which at its fulcrum adjacent the jaw 18 is formed with a round horizontal boss 17 in which is a horizontally disposed hole 19 for the pivot rivet 21. Preferably the outer end of handle 16 is formed with a downward projection 22, which limits downward the movement of the handle and insures space for the fingers of the operator between the handle and the object on which the strap is applied. On the end of the pivot opposite the handle is the upper jaw 18, hereinafter described in detail.

The lower jaw member 13 also is provided with an elongated handle 26 which widens out near the fulcrum area into a downwardly forwardly slanted widened portion 27 formed with a central slot 28 into which the boss 17 of member 12 fits. Horizontal holes are drilled through the widened portion 27 in registry with hole 19 in boss 17 to accommodate counter sunk rivet 21 which secures the two members 12 and 13 together for relative pivotal movement similar to a scissors. Opposite handle 26 is lower jaw 31, likewise hereinafter described in detail.

Figure 3:
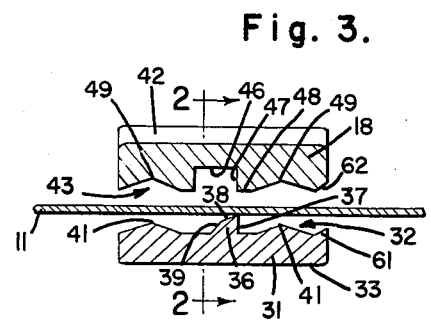
FIG. 3 is a transverse sectional view taken substantially along line 3—3 of FIG. 2 showing the jaws open.
Figure 4:
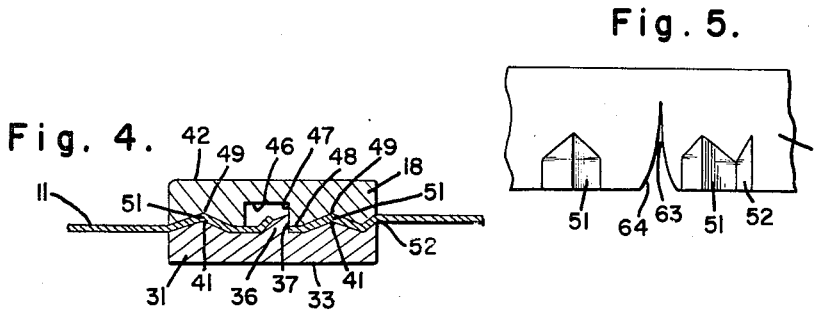
FIG. 4 is a view similar to FIG. 3 showing the jaws closed.

The two jaws 18 and 31 are complementary to each other. Turning first to the lower jaw 31, this member is milled of flat bar stock, having parallel top and bottom surfaces 32, 33, and an upwardly slanted nose 34 to facilitate insertion under the strap 11. The inner end of jaw 31 merges with portion 27 and is welded thereto. Top surface 32 is milled out to provide a center upward projection 36 with a vertical shearing edge 37, a flat top 38 and a buttress edge 39 opposite the shearing edge. To either side of the central projection 36 are gripping projections 41 which are generally triangular in cross section. Immediately to the right of right-hand projection 41 (as viewed in FIG. 3) is a short upwardly slanted ridge 61. The apexes of projections 41 and 61 are lower than the elevation of surface 38.

Upper jaw 18 is also formed of milled bar stock, having parallel top and bottom surfaces 42, 43. The inner end of jaw 18 merges with slanted portion 44 at the end of handle 16 and is welded thereto. The upper jaw 18 is formed with a rectangular central recess 46 having a vertical side wall 47 and adjacent horizontal surface 48 which cooperate with the shearing edge 37 of the lower jaw to sever the strap placed between the jaws. The width of the central recess 46 is sufficient to accommodate the central projection 36 of the lower jaw. To either side of the central recess 46 are gripping recesses 49 which have a general triangular cross-sectional shape complementary to the gripping projections 41 of the opposite jaw. Immediately to the right of right-hand recess 49 is a bevelled edge 62 complementary to ridge 61.

The elevation of flat surface 38 of central projection 36 is approximately one-sixteenth inch greater than the elevation of the gripping projections 41. This construction of the jaw members insures that severing of the strap 11 commences before the strap is gripped between the projections 41 and the depressions 49. However, it will be understood that the strap is not severed instantaneously across its entire width but that the cutting of the strap begins at the edge closest to the pivot 21 and proceeds directly across the width of the strap. As the cutting of the strap proceeds the strap may be deformed and pulled apart in the vicinity of the severed portion and this enables the strap to be crimped into the recesses 47 and held by the projections 41.

Figure 5:
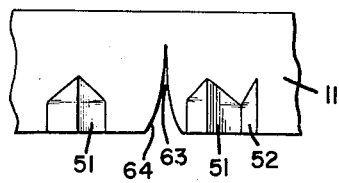
FIG. 5 is a schematic view of a strap partially severed and crimped in accordance with this invention.

Thus as shown in schematic FIG. 5, when the strap 11 is partially severed, the shear or cut line 63 extends partially across the width of strap 11. Behind point 63 the cut widens out in a V shape 64. To either side of V 64 are crimps 51, formed by recess 49 and projection 41 here shown as having pointed inner ends, the material for the crimps 51 coming from the spread out portion 64. Likewise crimp 52 is formed by ridge 61 and bevel 62 located to the right of right-hand crimp 51.

Accordingly, the operation of the tool is exceedingly simple. With jaws 18, 31 open and handles 16, 26 spaced apart, the lower jaw 31 is inserted under the strap. The operator then grips the handles and pulls upwardly on the upper jaw handle 16. This brings the shearing edges 37, 47 into contact with the upper and lower surfaces of strap 11 and begins the shearing action. Shearing proceeds across the strap from the edge closest to the pivot 21 toward the opposite edge. The ends of the severed strap are gripped and crimped between the jaws 18, 31 deforming into recesses 49 in crimps 51 and also deforming into bevel 62 in crimp 52 which hold the strap after it is severed. After the severing is completed the handles 16, 26 are gradually pulled apart and the tension on the strap gradually released which permits the severed ends to move apart without danger of injury to personnel and property.

What is claimed is:

1. A steel strap cutting tool comprising an upper jaw, an upper jaw handle fixed to said upper jaw, a lower jaw, a lower jaw handle fixed to said lower jaw, pivot means pivotally connecting said handles together, each of said jaws comprising a solid member integral with its handle, one said jaw being formed with a longitudinal central recess and a first shearing edge along one longitudinal edge of said recess, the other said jaw being formed with a central projection having a second shearing edge in shearing juxtaposition to said first shearing edge, one of said jaws being formed with at least one pair of longitudinally extending gripping recesses spaced laterally to either side of said central recess, the other of said jaws formed with at least one pair of gripping projections mating with said gripping recesses, said gripping projections fitting into and contacting the bottoms of said gripping recesses in the closed position of said tool, the elevation of said central projection being slightly greater than that of said gripping projections whereby as said jaws are closed upon a strap positioned between said jaws, said strap is sheared commencing at a first strap edge closest to the pivot means and proceeding across said strap and as said strap is sheared the edges are pulled apart and crimps are formed between said gripping projections and said gripping recesses commencing at said first strap edge and proceeding across said strap.

2. A steel strap cutting tool comprising an upper jaw, an upper jaw handle fixed to said upper jaw, a lower jaw, a lower jaw handle fixed to said lower jaw, pivot means pivotally connecting said handles together, each of said jaws comprising a solid, member integral with its handle, said upper jaw being formed with a longitudinal central recess, a first shearing edge along one wall of said central recess, a shearing surface adjacent one side of said first shearing edge, and a pair of gripping recesses spaced laterally on either side of said central recess and extending longitudinally of said central recess, said lower jaw being formed with a central projection having a second shearing edge in shearing relationship to said first shearing edge and a pair of gripping projections spaced laterally of said central propection and in registry with said gripping recesses, said gripping projections fitting into and contacting the bottoms of said gripping recesses in the closed position of said tool, the elevation of said central projection being slightly greater than that of said gripping projections, whereby in normal operation of said tool a strap placed between said jaws is first partially sheared by said shearing edges and partially retained intact and portions of said strap to either side of the sheared portion are at least partially crimped between said gripping projections and said gripping recesses, whereby upon completion of shearing the ends of the sheared strap are retained by said tool.

References Cited in the file of this patent

UNITED STATES PATENTS

| | | |
|---|---|---|
| 201,006 | Hale | Mar. 5, 1878 |
| 233,410 | Hale | Oct. 19, 1880 |
| 1,444,044 | Tener | Feb. 6, 1923 |